(12) United States Patent
Hirata et al.

(10) Patent No.: US 7,685,810 B2
(45) Date of Patent: Mar. 30, 2010

(54) ENGINE CONTROL APPARATUS AND ENGINE OPERATING METHOD

(75) Inventors: Kiminobu Hirata, Ageo (JP); Takehiro Esaka, Ageo (JP)

(73) Assignee: Nissan Diesel Motor Co., Ltd., Ageo-Shi (JP)

( * ) Notice: Subject to any disclaimer, the term of this patent is extended or adjusted under 35 U.S.C. 154(b) by 0 days.

(21) Appl. No.: 10/576,720

(22) PCT Filed: Sep. 13, 2004

(86) PCT No.: PCT/JP2004/013307

§ 371 (c)(1),
(2), (4) Date: Dec. 13, 2006

(87) PCT Pub. No.: WO2005/040569

PCT Pub. Date: May 6, 2005

(65) Prior Publication Data

US 2007/0079601 A1    Apr. 12, 2007

(30) Foreign Application Priority Data

Oct. 22, 2003    (JP)    .............................. 2003-362411
Feb. 2, 2004     (JP)    .............................. 2004-026056

(51) Int. Cl.
    *F01N 3/00*    (2006.01)
(52) U.S. Cl. .............................. 60/277; 60/274; 60/278; 60/280; 60/286; 60/303; 123/479; 123/690; 73/114.69; 73/114.71
(58) Field of Classification Search .................. 60/274, 60/276, 277, 278, 280, 286, 295, 303, 285; 123/479, 690; 73/118.1, 114.69, 114.71, 73/114.75

See application file for complete search history.

(56) References Cited

U.S. PATENT DOCUMENTS

| 4,854,123 | A  | * | 8/1989  | Inoue ........................ 60/274 |
| 5,186,148 | A  | * | 2/1993  | Wataya ...................... 123/479 |
| 5,845,487 | A  | * | 12/1998 | Fraenkle et al. ............. 60/274 |
| 6,119,448 | A  | * | 9/2000  | Emmerling et al. .......... 60/274 |
| 6,487,852 | B1 | * | 12/2002 | Murphy et al. ............... 60/286 |
| 6,546,720 | B2 | * | 4/2003  | van Nieuwstadt ........... 60/286 |
| 7,143,756 | B2 |   | 12/2006 | Kojima et al. |
| 7,216,478 | B2 | * | 5/2007  | Brown et al. ................. 60/277 |
| 2004/0177605 | A1 | | 9/2004 | Kojima et al. |

FOREIGN PATENT DOCUMENTS

| JP | 07-011999   | 1/1995 |
| JP | 11-270369   | 5/1999 |
| JP | 2000-027627 | 1/2000 |
| JP | 2001-020724 | 1/2001 |

(Continued)

*Primary Examiner*—Binh Q. Tran
(74) *Attorney, Agent, or Firm*—McDermott Will & Emery LLP

(57) ABSTRACT

When an abnormality occurred in a SCR device is detected, the output of an engine is restricted. To this end, in one embodiment, at the time of an abnormality occurrence, a map adopted for calculating a fuel injection quantity is switched from that for a normal time (S407). Further, as the abnormality to be detected, the clogging of an injection nozzle, the dilution of urea water stored in a tank, or the like is adopted.

20 Claims, 13 Drawing Sheets

FOREIGN PATENT DOCUMENTS

| | | |
|---|---|---|
| JP | 2001-152831 | 6/2001 |
| JP | 2001-213192 | 8/2001 |
| JP | 2001-228004 | 8/2001 |
| JP | 2002-242780 | 8/2002 |
| JP | 2002-371831 | 12/2002 |
| JP | 2003-214223 | 7/2003 |
| JP | 2003-254048 | 9/2003 |
| JP | 2003-529011 | 9/2003 |
| WO | WO-00-75643 | 12/2000 |
| WO | WO-03-072916 | 9/2003 |

* cited by examiner

ENGINE CONTROL APPARATUS AND ENGINE OPERATING METHOD

This application is a continuation of PCT/JP2004/013307, filed on Sep. 13, 2004.

BACKGROUND OF THE INVENTION

1. Field of the Invention

The present invention relates to an engine control apparatus and an engine operating method, and in particular, to a technology for purifying nitrogen oxides discharged from an automobile engine, using ammonia as a reducing agent.

2. Description of the Related Art

As a device for purifying air pollutants discharged from an engine, in particular, nitrogen oxides (to be referred to as $NO_x$ hereunder) in exhaust gas, using a secondary treatment, the following SCR (Selective Catalytic Reduction) device is known. This SCR device is installed in an exhaust passage of an engine, and is provided with an injection nozzle which injects an aqueous solution of ammonia or a precursor thereof. Ammonia (or ammonia obtained from the precursor) injected from the injection nozzle functions as a reducing agent, and reacts with $NO_x$ in the exhaust gas on a catalyst to reductively purify the $NO_x$. As an SCR device that addresses ease of onboard storage of ammonia, one as described in the following is known. This SCR device is provided with a tank which stores urea as a precursor of ammonia in a state of aqueous solution, and in an actual operation, the urea water supplied from the tank is injected into the exhaust passage, so as to generate ammonia from hydrolysis of the urea using exhaust heat (Japanese Unexamined Patent Publication No. 2000-027627).

However, such an SCR device as described in the above has the following problems. As a setting related to an engine operation, there is a case where a setting for particularly reducing a particulate discharge amount is adopted. In such a setting, generally a $NO_x$ discharge amount is increased. If the SCR device is normally operated, discharged $NO_x$ can be purified by the reduction reaction with ammonia. Under such a setting in which a certain level of $NO_x$ discharge is permitted, an assumption is made on a case where an abnormality occurs in the SCR device so that a urea water injection quantity is changed or an ammonia content amount in the urea water (that is, the urea concentration) is changed. In such a case, since an ammonia addition amount to the exhaust gas is changed, a ratio between $NO_x$ and ammonia is deviated from a proper value, so that the reduction reaction is not progressed satisfactorily and the $NO_x$ removal rate does not fulfill the requirement. In particular, in the case where the ammonia addition amount is decreased, $NO_x$ is discharged into the atmosphere without being purified. Further, in the case where water or different type of aqueous solution than urea water is stored in the tank, or in the case where the tank is empty, the same result as the above is led. When such an abnormality occurs in the SCR device, it is necessary to repair the SCR device promptly, in order to suppress the $NO_x$ discharge. However, the abnormality occurred in the SCR device does not appear in the behavior of the automobile, and accordingly, a driver is unable to take notice of such an abnormality. Further, even if measures for operating a warning light or an alert are taken, it may be considered that the driver fails to perform the prompt repair.

SUMMARY OF THE INVENTION

An object of the present invention is to urge a driver to perform the repair of an SCR device at an early stage, so as to achieve appropriate maintenance of the SCR device.

Therefore, according to the present invention, in an engine provided with an addition device which adds a NOx reducing agent to exhaust gas, at the time of an abnormality occurrence when an abnormality occurred in the addition device is detected, an output of the engine is restricted. Preferably, at the time of the abnormality occurrence, an output characteristic of the engine relative to an accelerator operation by a driver is varied from that at a normal time other than the time of the abnormality occurrence, or the restarting of the engine operation after an engine operation stops, is inhibited.

According to the present invention, when an abnormality occurs in an addition device so that a NOx reducing agent in an accurate amount cannot be added to exhaust gas of an engine, an output of the engine is restricted, and for example, an output characteristic of the engine relative to an accelerator operation by a driver is varied, and a fuel injection quantity is decreased than that at a normal time under the same accelerator operating amount. Therefore, it is possible to restrict the moving of an automobile in a state where $NO_x$ is not satisfactorily purified, and also to urge the driver to repair the addition device. Further, in addition to or in place of the restriction due to the alteration of the output characteristics, it is possible to restrict the moving and also to urge the repair of the addition device by inhibiting the restarting after an engine operation stops.

Other objects, features and advantages of the present invention will be apparent from the following description of the embodiments with reference to the accompanying drawings.

The entire contents of Japanese Patent Application Nos. 2003-362411 and 2004-026056, which are the bases for priority claims, are incorporated herein by reference.

BRIEF DESCRIPTION OF THE DRAWINGS

FIG. 8 shows a flowchart of a fuel cutting routine.

DESCRIPTION OF THE PREFERRED EMBODIMENTS

The present invention will be described hereunder referring to the appended drawings.

Figure 1:
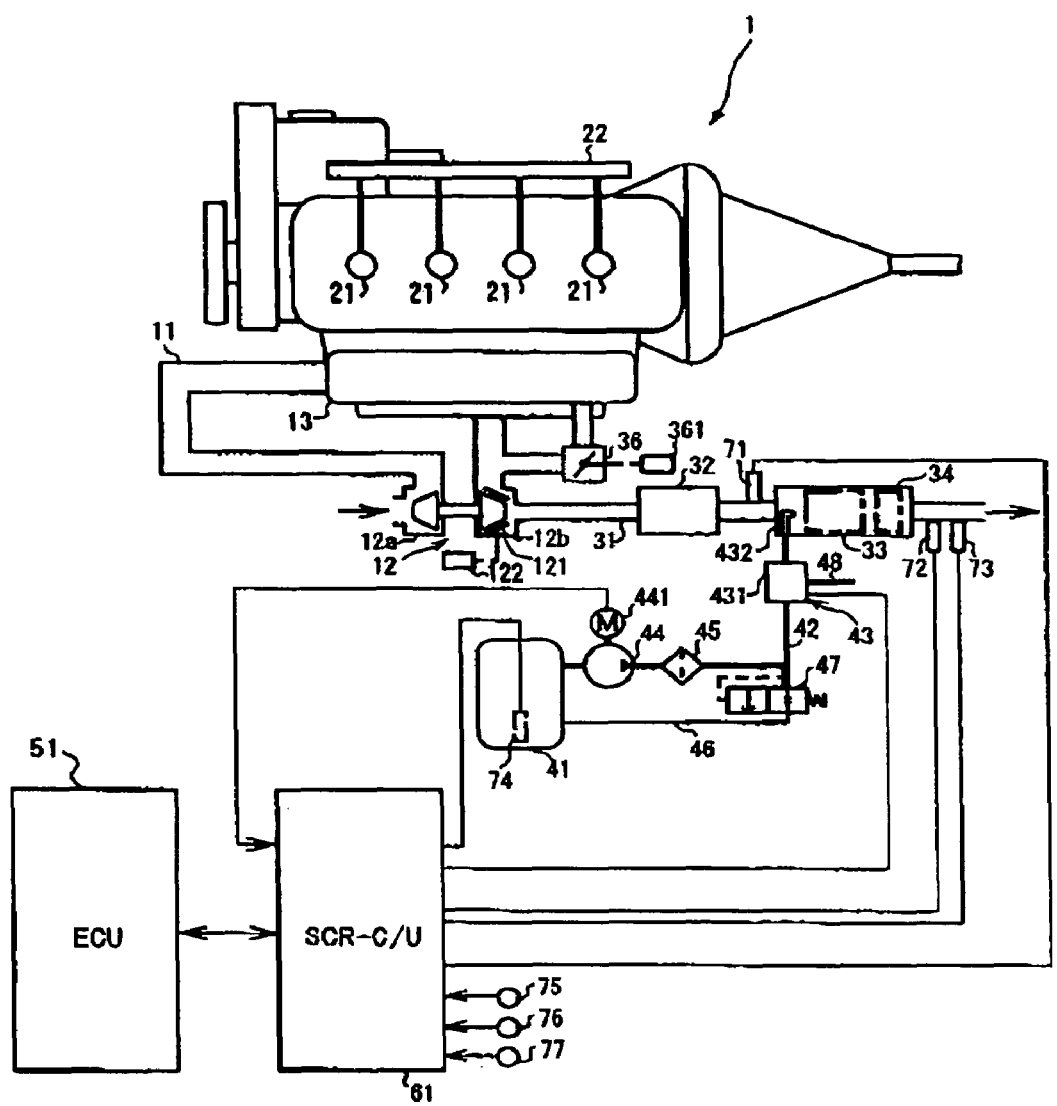
FIG. 1 shows an entire configuration of an engine according to a first embodiment of the present invention.

FIG. 1 shows an entire configuration of an automobile engine (to be referred to as an engine hereunder) according to a first embodiment of the present invention. In the present embodiment, as an engine 1, a direct injection type diesel engine is adopted.

To an inlet portion of an intake passage 11, an air cleaner (not shown in the figure) is attached, and the dust in the intake air is removed by this air cleaner. In the intake passage 11, a compressor 12a of a variable nozzle type turbocharger 12 is disposed, so that the intake air is compressed by the compressor 12a to be sent out. The compressed intake air is flown into a surge tank 13, and is distributed to each cylinder via a manifold portion.

In the engine body, an injector 21 is disposed to a cylinder head for each cylinder. The injector 21 is operated according to a signal from an engine control unit (to be referred to as an engine C/U hereunder) 51. Fuel sent out by a fuel pump (not shown in the figure) is supplied via a common rail 22 to the injector 21, and is directly injected into a combustion chamber by the injector 21.

In an exhaust passage 31, a turbine 12b of the turbocharger 12 is disposed downstream of the manifold portion. The turbine 12b is driven by the exhaust gas, so that the compressor 12a is rotated. Angles of movable vanes 121 of the turbine 12b are controlled by an actuator 122. Rotating speeds of the turbine 12b and of the compressor 12a are changed according to the angles of the movable vanes 121.

On the downstream of the turbine 12b, an oxidation catalyst 32, a $NO_x$ purification catalyst 33 and an ammonia purification catalyst 34 are disposed in this order from the upstream side. The oxidation catalyst 32 oxidizes hydrocarbons and carbon monoxides in the exhaust gas, and also converts nitrogen monoxides (to be referred to as NO hereunder) in the exhaust gas into $NO_x$ mainly containing nitrogen dioxides (to be referred to as $NO_2$ hereunder), to thereby perform an operation of adjusting a ratio between NO and $NO_2$ contained in the exhaust gas to a ratio optimum for the $NO_x$ reduction reaction (to be described later). The $NO_x$ purification catalyst 33 reductively purifies $NO_x$. In order to promote the reduction on the $NO_x$ purification catalyst 33, in the present embodiment, ammonia serving as a reducing agent for NOx is added to the exhaust gas upstream of the $NO_x$ purification catalyst 33.

In the present embodiment, considering ease of onboard storage of ammonia, urea as a precursor of ammonia is stored in a state of aqueous solution. By storing ammonia as urea, it is possible to ensure the safety.

To a tank 41 storing the urea water, a urea water supply pipe 42 is connected, and to a tip end of the urea water supply pipe 42, an injection nozzle 43 for the urea water is attached. On the urea water supply pipe 42, a feed pump 44 and a filter 45 are disposed in this order from the upstream side. The feed pump 44 is driven by an electric motor 441. The electric motor 441 whose rotating speed is controlled based on a signal from a SCR control unit (to be referred to as an SCR-C/U hereunder) 61, adjusts a discharge quantity from the feed pump 44. Further, on the downstream of the filter 45, a urea water return pipe 46 is connected to the urea water supply pipe 42. In the urea water return pipe 46, a pressure control valve 47 is installed, so that surplus urea water in a quantity exceeding a specified pressure returns to the tank 41.

The injection nozzle 43 is an air-assist type injection nozzle, and includes a main body 431 and a nozzle part 432. To the main body 431, the urea water supply pipe 42 is connected, and also an air supply pipe 48 for supplying air for assisting (to be referred to as assist air hereunder) is connected. The air supply pipe 48 is connected to an air tank (not shown in the figure), and the assist air is supplied from this air tank. The nozzle part 432 is disposed upstream of the $NO_x$ purification catalyst 33, so as to laterally pass through a housing of the $NO_x$ purification catalyst 33 and the ammonia purification catalyst 34. An injection direction of the nozzle part 432 is set in a direction parallel to the flow of the exhaust gas, toward an end face of the $NO_x$ purification catalyst 33.

When the urea water is injected, urea in the injected urea water is hydrolyzed due to the exhaust heat, so that ammonia is generated. The generated ammonia functions as a reducing agent for $NO_x$ on the $NO_x$ purification catalyst 33, to promote the $NO_x$ reduction. The ammonia purification catalyst 34 is one for purifying slip-ammonia which passes through the $NO_x$ purification catalyst 33 without contributing to the $NO_x$ reduction. Since ammonia has an irritating odor, it is not preferable for ammonia to be discharged without purification. The oxidation reaction of NO on the oxidation catalyst 32, the hydrolysis reaction of urea, the reduction reaction of $NO_x$ on the $NO_x$ purification catalyst 33, and the oxidation reaction of slip-ammonia on the ammonia purification catalyst 34 are respectively expressed by the following formulas (1) to (4). In the present embodiment, the $NO_x$ purification catalyst 33 and the ammonia purification catalyst 34 are integrated in a single housing. However, the respective catalysts 33 and 34 may be integrated separately in individual housings.

$$NO + \tfrac{1}{2}O_2 \rightarrow NO_2 \tag{1}$$

$$(NH_2)_2CO + H_2O \rightarrow 2NH_3 + CO_2 \tag{2}$$

$$NO + NO_2 + 2NH_3 \rightarrow 2N_2 + 3H_2O \tag{3}$$

$$4NH_3 + 3O_2 \rightarrow 2N_2 + 6H_2O \tag{4}$$

Further, the exhaust passage 31 is connected to the intake passage 11 via an EGR pipe 35. The exhaust gas is recirculated to the intake passage 11 via the EGR pipe 35. In the EGR pipe 35, an EGR valve 36 is installed, and a flow rate of the exhaust gas to be recirculated is controlled by the EGR valve 36. An opening of the EGR valve 36 is controlled by an actuator 361.

In the exhaust passage 31, a temperature sensor 71 for detecting a temperature of the exhaust gas before addition of the urea water, is disposed between the oxidation catalyst 32 and the $NO_x$ purification catalyst 33. On the downstream of the ammonia purification catalyst 34, a temperature sensor 72 for detecting a temperature of the exhaust gas after the reduction, and a $NO_x$ sensor 73 for detecting a concentration of $NO_x$ contained in the exhaust gas after the reduction are disposed. Further, in the tank 41, a urea sensor 74 for detecting a concentration (hereunder, when the word "concentration" is simply used, this word means "urea concentration") Dn of urea contained in the stored urea water is disposed. The present embodiment, the urea sensor 74 also has a function of judging a quantity of the urea water remained in the tank 41.

Detection signals from the temperature sensors 71 and 72, the $NO_x$ sensor 73 and the urea sensor 74 are output to the SCR-C/U 61. The. SCR-C/U 61 calculates and sets an optimum urea water injection quantity based on the input signals, to output a command signal according to the set urea water injection quantity to the injection nozzle 43. Further, the SCR-C/U 61 is connected to the engine C/U 51 so as to be capable of communicating bi-directionally. The SCR-C/U 61 receives an assist air pressure Pa, a urea water pressure Pu and a urea sensor voltage Vs in addition to the detection signals from the above sensors 71 to 74. The assist air pressure Pa is a pressure inside the air supply pipe 48, and is detected by a pressure sensor 75 disposed in the air supply pipe 48. The urea water pressure Pu is a pressure inside the urea water supply pipe 42, and is detected by a pressure sensor 76 disposed in the urea water supply pipe 42 downstream of the feed pump 44. The urea sensor voltage Vs is a voltage which is output according to the concentration detected by the urea sensor 74, and is detected by a voltage sensor 77 The SCR-C/U 61 detects an abnormality occurred in a urea water injection system as described later, based on the assist air pressure Pa, the urea water pressure Pu, the urea sensor voltage Vs and the concentration Dn, and also the judgment result of the residual quantity of the urea water, and outputs a signal indicating an abnormality occurrence to the engine C/U 51.

In the engine 1, an ignition switch, a start switch, a crank angle sensor, a vehicle speed sensor, an accelerator sensor and the like are installed, and detection signals thereof are input to the engine C/U 51. The engine C/U 51 calculates an engine rotating speed Ne based on the signal input from the crank angle sensor. The engine C/U 51 calculates a fuel injection quantity Qf based on operating conditions such as the engine rotating speed Ne and the like, and also outputs to the SCR-C/U 61 information necessary for an injection control of the urea water, such as the calculated Qf and the like.

In the present embodiment, the engine C/U 51 corresponds to a first control unit and the SCR-C/U 61 corresponds to a second control unit.

Figure 2:
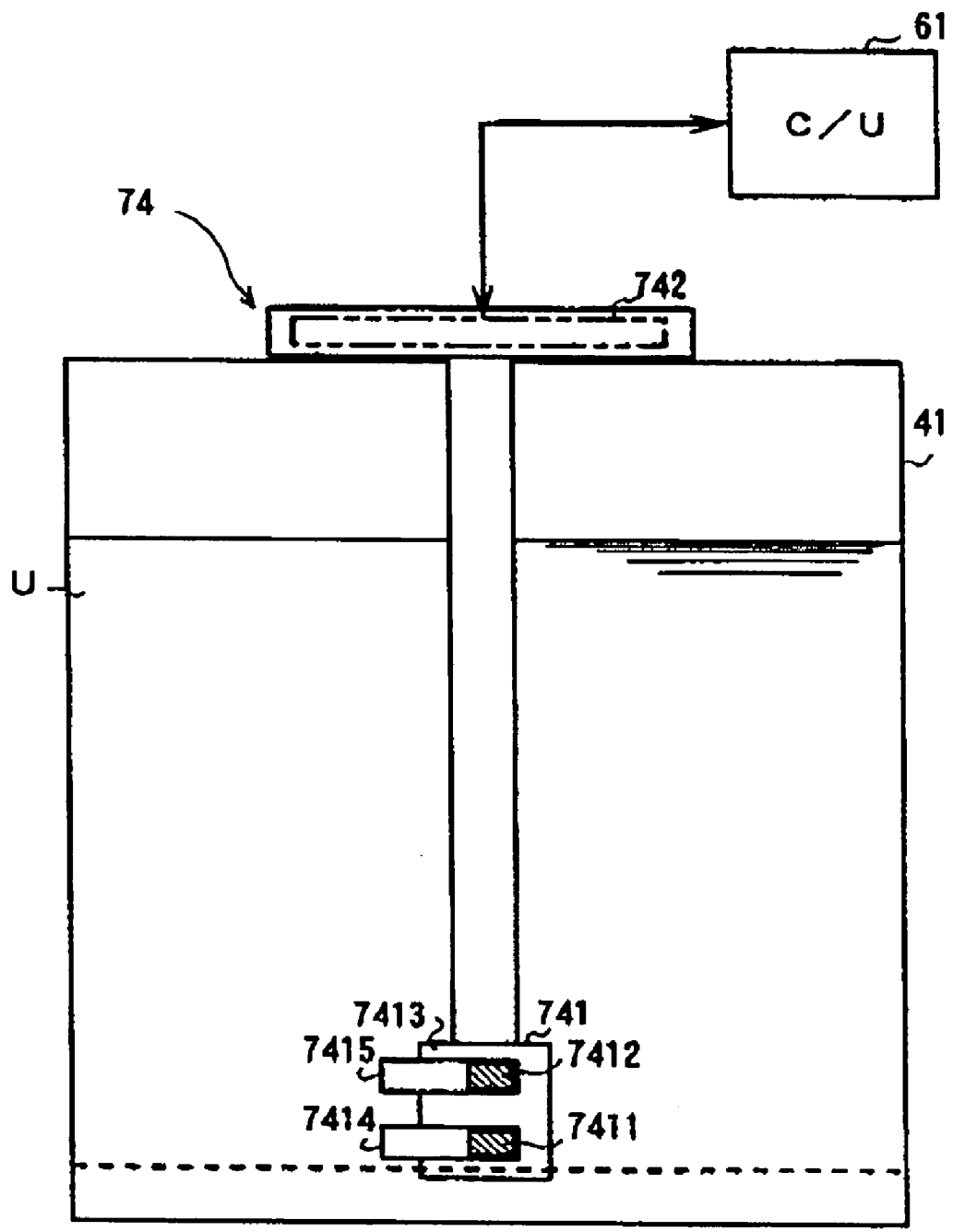
FIG. 2 shows a configuration of a urea sensor.

FIG. 2 shows a configuration of the urea sensor 74.

The urea sensor 74 is configured same as a flow meter disclosed in Japanese Unexamined Patent Publication No. 2001-228004, and detects a urea concentration based on electrical characteristic values of two temperature sensing elements.

The flow meter disclosed in the above publication is provided with a first sensor element which has a heater function and a second sensor element which does not have a heater function. The former first sensor element includes a heater layer, and a resistance temperature sensing layer (to be referred to as a first resistance temperature sensing layer) serving as a temperature sensing element, which is formed on the heater layer in an insulated state. The latter second sensor element includes a resistance temperature sensing layer (to be referred to as a second resistance temperature sensing layer) as a temperature sensing element, but does not include a heater layer. Each sensor element is integrated in a resin housing, and is connected to one end of a fin plate serving as a heat transfer body.

In the urea sensor 74 according to the present embodiment, a sensor element part 741 is configured to include the first and second sensor elements. The sensor element part 741, when the concentration is detected, is immersed in the urea water to be used, and is disposed in the vicinity of a bottom of the tank 41. Further, respective fin plates 7414 and 7415 pass through a housing 7413 to expose to the inside of the tank 41.

A circuit part 742 is connected to the heater layer and the resistance temperature sensing layer of the first sensor element 7411, and also to the resistance temperature sensing layer of the second sensor element 7412. The circuit part 742 supplies the electric power to the heater layer to heat the first resistance temperature sensing layer, and detects resistance values Rn1 and Rn2 of the heated first resistance temperature sensing layer and the not-directly heated second resistance temperature sensing layer. The resistance temperature sensing layer has a characteristic in which the resistance value thereof is changed in proportion to the temperature. The circuit part 742 calculates the concentration Dn as follows based on the detected resistance values Rn1 and Rn2, and also judges the residual quantity of the urea water.

Figure 3:
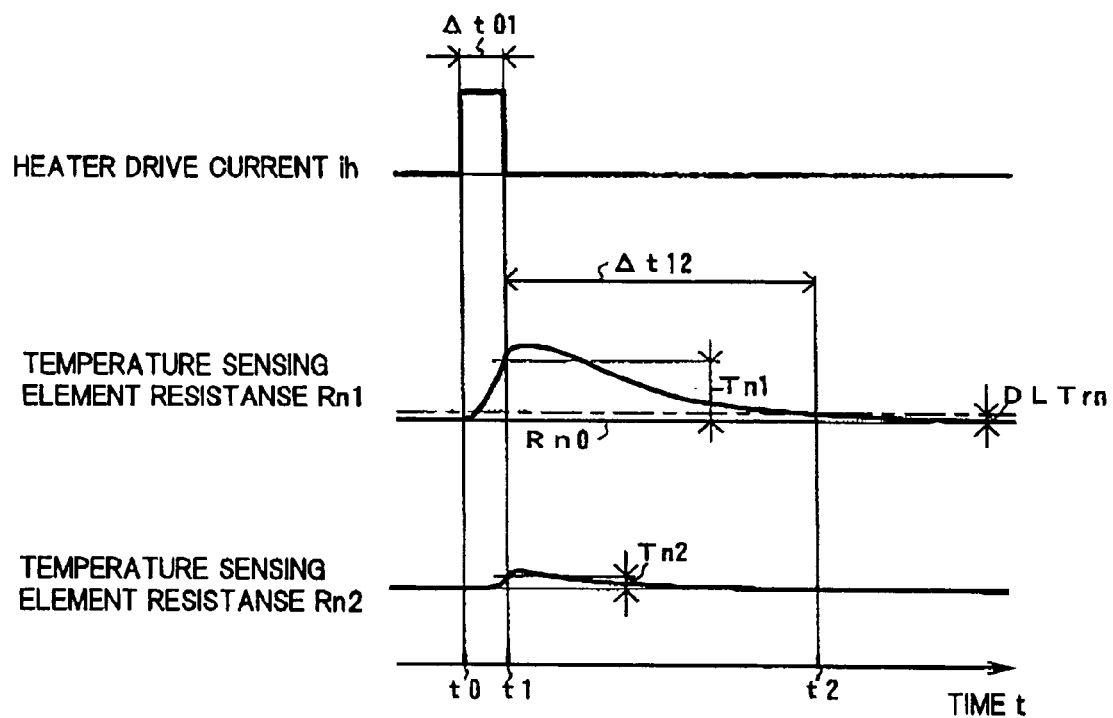
FIG. 3 illustrates the principle of concentration detection by the urea sensor of FIG. 2.

FIG. 3 illustrates the principles of the concentration detection and the residual quantity judgment.

The heating by the heater layer is performed by supplying a heater drive current ih to the heater layer for a predetermined period of time $\Delta t01$. The circuit part 742, at the time when the supply of the electrical current to the heater layer is stopped, detects the resistance values Rn1 and Rn2 of the respective resistance temperature sensing layers, and also calculates a temperature difference $\Delta Tmp12$ ($=Tn1-Tn2$) between the resistance temperature sensing layers. The temperature difference between the resistance temperature sensing layers depends on a heat transfer characteristic with the urea water as a medium, and this heat transfer characteristic depends on the urea concentration. Therefore, it is possible to convert the calculated temperature difference $\Delta Tmp12$ into the concentration Dn. Further, it is possible to judge whether or not the tank 41 is empty, based on the calculated temperature difference $\Delta Tmp12$.

In the present embodiment, the sensor element part 741 is configured such that, in the first sensor element 7411, the first resistance temperature sensing layer is in contact with the urea water via the fin plate 7414. However, the sensor element part 741 may be configured with a measuring chamber for leading the urea water in the tank 41 within the sensor element part 741 such that the first resistance temperature sensing layer is heated by the heater via the urea water in this measuring chamber. In this case, the first resistance temperature sensing layer and the urea water are in contact directly with each other.

Next, operations of the engine C/U 51 and the SCR-C/U 61 are described referring to flowcharts.

Firstly, the operation of the SCR-C/U 61 is described.

Figure 4:
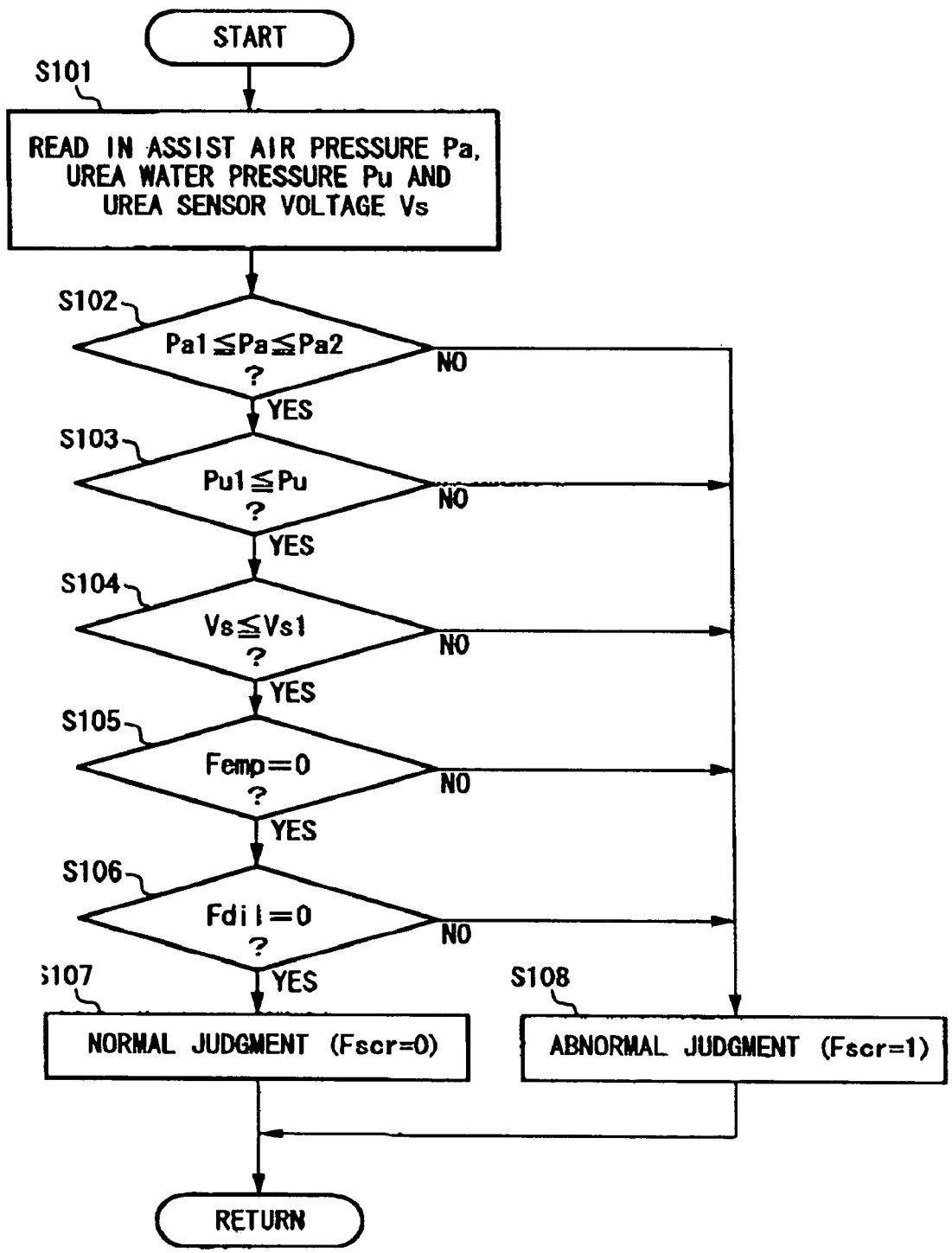
FIG. 4 shows a flowchart of an abnormality detection routine.

FIG. 4 shows a flowchart of an abnormality detection routine. This routine is started when the ignition switch is turned on, and thereafter, is repetitively executed at each predetermined time. According to this routine, the abnormality occurred in the urea water injection system is detected.

In S101, the assist air pressure Pa, the urea water pressure Pu and the urea sensor voltage Vs are read in.

In S102, it is judged whether or not the assist air pressure Pa is within a predetermined range where a predetermined value Pa2 is an upper limit and a predetermined value Pa1 (<Pa2) is a lower limit. When the assist air pressure Pa is within this range, the routine proceeds to S103, while when the assist air pressure Pa is without this range, the routine proceeds to S108. When an assist air pressure smaller than the value Pa1 is detected, it is possible to judge that a leakage of the assist air occurs in the air supply pipe 42. When an assist air pressure larger than the value Pa2 is detected, it is possible to judge that a clogging occurs in the injection nozzle 43. The clogging of the injection nozzle 43 occurs in the case where the passage is blocked by urea which is condensed in the nozzle portion 432 or the like.

In S103, it is judged whether or not the urea water pressure Pu is equal to or larger than a predetermined value Pu1. When the urea water pressure Pu is equal to or larger than the value Pu1, the routine proceeds to S104, while when the urea water pressure Pu is smaller than the value Pu1, the routine proceeds to S108. When a urea water pressure smaller than the value Pu1 is detected, it is possible to judge that the feed pump 44 is failed so that the urea water cannot be supplied by a sufficient pressure.

In S104, it is judged whether or not the urea sensor voltage Vs is equal to or smaller than a predetermined value Vs1. When the urea sensor voltage Vs is equal to or smaller than the value Vs1, the routine proceeds to S105, while when the urea sensor voltage Vs is larger than the value Vs1, the routine proceeds to S108. When a urea sensor voltage larger than the value Vs1 is detected, it is possible to judge that a disconnection occurs in the sensor element part 741.

In S105, a residual quantity judgment flag Femp is read in, and it is judged whether or not the read flag Femp is 0. When the flag Femp is 0, the routine proceeds to S106, while when the flag Femp is not 0, the routine proceeds to S108. The residual quantity judgment flag Femp is normally set at 0, and is switched to 1 when it is judged that the tank 41 is empty as described later.

In S106, a dilution judgment flag Fdil is read in, and it is judged whether or not the read flag Fdil is 0. When the flag Fdil is 0, the routine proceeds to S107, while when the flag Fdil is not 0, the routine proceeds to S108. The dilution judgment flag Fdil is normally set at 0, and is switched to 1 when it is judged that the urea water in the tank 41 is excessively diluted as described later.

In S107, it is judged that the assumed abnormality does not occur in the urea water injection system, and an abnormality judgment flag Fscr is set at 0. Here, the leakage of the assist air, the clogging of the injection nozzle 43, the failure of the feed pump 44, the disconnection of the sensor element part 741, the lack of the residual quantity of the urea water and the dilution of the urea water, as detected in the above manner, are abnormalities to be detected relating to the present embodiment.

In S108, it is judged that any abnormality occurs in the urea water injection system, and the abnormality judgment flag Fscr is set at 1, and also a warning light is operated, to thereby notify a driver of the abnormality occurrence.

Figure 5:
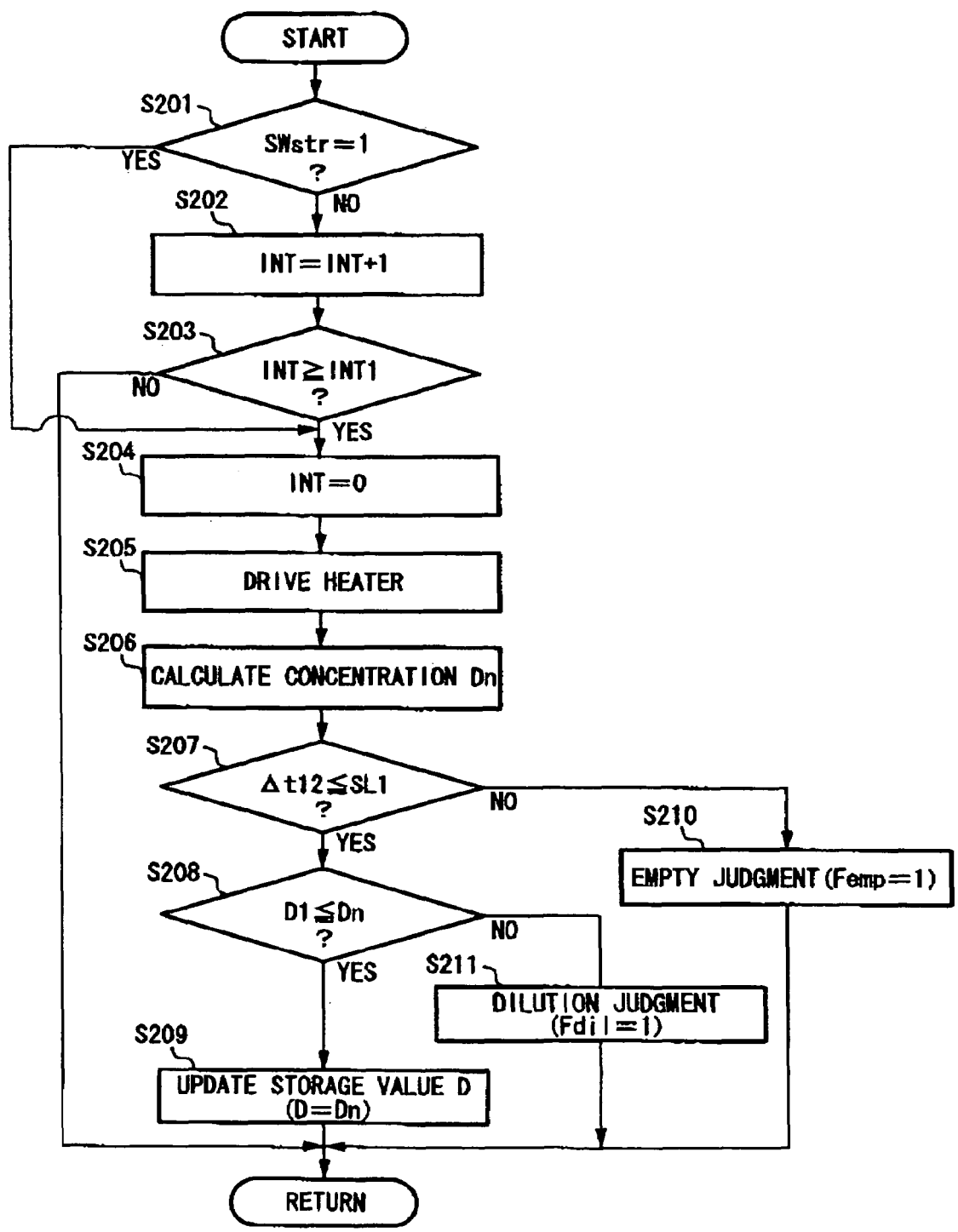
FIG. 5 shows a flowchart of a concentration detection routine.

FIG. 5 shows a flowchart of a concentration detection routine. This routine is started when the ignition switch is turned on, and thereafter, is repetitively executed at each predetermined time. According to this routine, the concentration Dn is detected, and also the residual quantity of the urea water is judged.

In S201, a start switch signal SWstr is read in, and it is judged whether or not the read signal SWstr indicates 1. When the signal SWstr indicates 1, it is judged that the start switch is turned on, and the routine proceeds to S204 where the concentration Dn is calculated as described later.

In S202, a detection interval counter INT is counted up by 1 (INT=INT+1).

In S203, it is judged whether or not a value of the counter INT after counted up reaches a predetermined value INT1. When the counter INT value reaches the value INT1, it is judged that a detection interval necessary for the detection of the concentration Dn is ensured, and the routine proceeds to S204, while when the counter INT value does not reach the value INT1, it is judged that such a detection interval is not ensured, and the routine is returned.

In S204, the detection interval counter INT is set at 0.

In S205, the electric power is supplied to the heater layer of the urea sensor 74, to heat the first resistance temperature sensing layer directly, and also to heat the second resistance temperature sensing layer indirectly with the urea water as the medium.

In S206, the concentration Dn is calculated. The calculation of the concentration Dn is performed by calculating the temperature difference ΔTmp12 between the resistance temperature sensing layers according to a difference between the resistance values Rn1 and Rn2 of the respective resistance temperature sensing layers, and converting the calculated temperature difference ΔTmp12 into the concentration Dn.

In S207, it is judged whether or not the calculated temperature difference ΔTmp12 is equal to or larger than a predetermined value SL1. When the temperature difference ΔTmp12 is equal to or larger than the value SL1, the routine proceeds to S208, while when the temperature difference ΔTmp12 is smaller than the value SL1, the routine proceeds to S210. The value SL1 is set at an intermediate value between the temperature difference ΔTmp12 obtained in a state where the urea sensor 74 is in the urea water, and the temperature difference ΔTmp12 obtained in a state where the urea sensor 74 is in the air.

In S208, it is judged whether or not the concentration Dn is equal to or larger than a predetermined value D1. When the concentration Dn is equal to or larger than the value D1, the routine proceeds to S209, while when the concentration Dn is smaller than the value D1, the routine proceeds to S211. The value D1 is set at 0 or a small value of approximately 0, as the concentration capable of being detected in the case where the urea water is in a water state or in a diluted state which approximates to the water state or in the case where different kind of aqueous solution than water or the urea water is stored in the tank 41.

In S209, the concentration Dn is stored as a concentration storage value D.

In S210, it is judged that the tank 41 is empty, and the residual quantity judgment flag Femp is set at 1.

In S211, it is judged that the urea water stored in the tank 41 is too dilute to achieve the required $NO_x$ purification efficiency, and the dilution judgment flag Fdil is set at 1.

Figure 6:
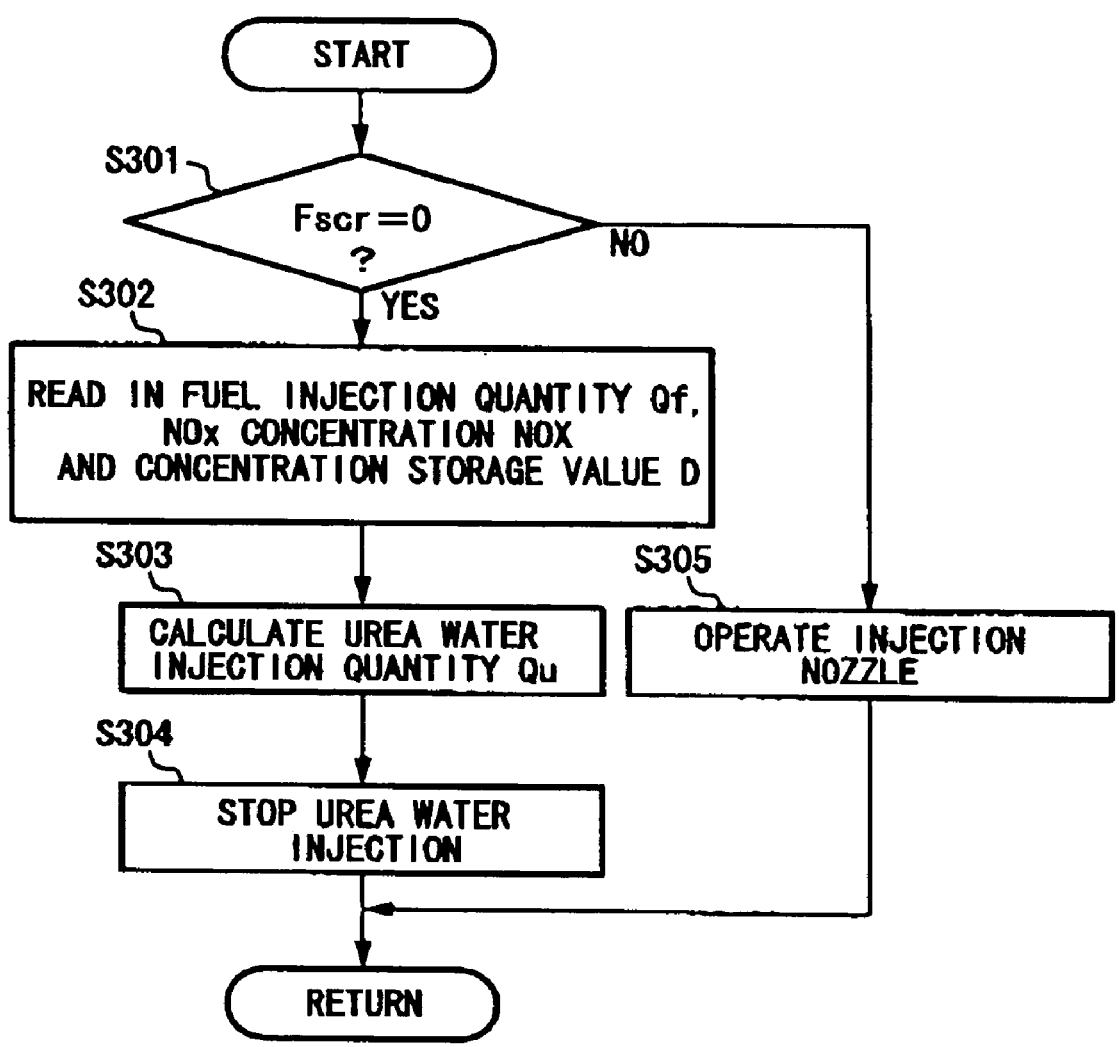

FIG. 6 shows a flowchart of a urea water injection control routine. This routine is started when the ignition switch is turned on, and thereafter, is repetitively executed at each predetermined time. According to this routine, a urea water injection quantity Qu is set.

In S301, the abnormality judgment flag Fscr is read in, and it is judged whether or not the read flag Fscr is 0. When the flag Fscr is 0, the routine proceeds to S302, while when the flag Fscr is not 0, it is judged that the abnormality occurs in the urea water injection system and the routine proceeds to S305.

In S302, the fuel injection quantity Qf, the $NO_x$ concentration NOX (or an output from the $NO_x$ sensor 73) and the concentration storage value D are read in.

In S303, the urea water injection quantity Qu is calculated. The calculation of the urea water injection quantity Qu is performed by calculating a basic injection quantity according to the fuel injection quantity Qf and the $NO_x$ concentration NOX, and also correcting the calculated basic injection quantity with the concentration storage value D. When the concentration storage value D is large and the urea content amount per unit injection quantity is high, the basic injection quantity is corrected to be decreased. On the other hand, when the concentration storage value D is small and the urea content amount per unit injection quantity is low, the basic injection quantity is corrected to be increased.

In S304, an operation signal according to the calculated urea water injection quantity Qu is output to the injection nozzle 43.

In S305, the injection of the urea water is stopped, since it is impossible to inject the urea water in accurate quantity relative to the $NO_x$ discharge amount in the state where the abnormality occurs in the urea water injection system. When the urea water injection quantity is smaller than a proper value, there is a possibility that $NO_x$ is discharged into the atmosphere without being purified. On the contrary, when the urea water injection quantity is larger than the proper value, there is a possibility that not only the urea water is unnecessarily consumed but also excessively generated ammonia is not completely decomposed by the ammonia purification catalyst 34 to be discharged into the atmosphere. Further, not only when the tank 41 is empty, but also when the urea water is excessively diluted or when not the urea water but water or the like is stored in the tank 41, it is not possible to add ammonia in necessary amount for the $NO_x$ purification.

Next, the operation of the engine C/U 51 is described.

Figure 7:
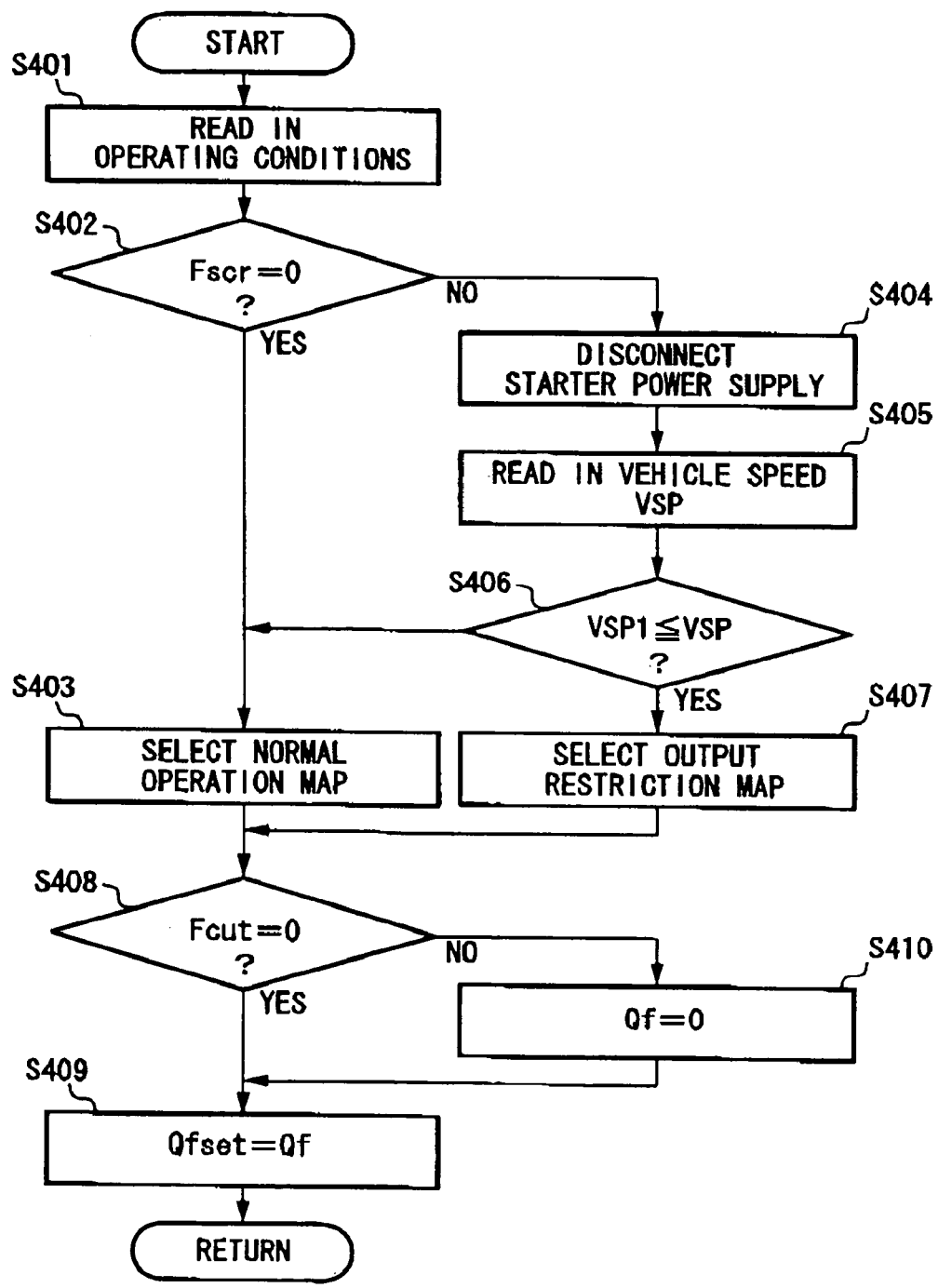
FIG. 7 shows a flowchart of a fuel injection quantity setting routine.

FIG. 7 shows a flowchart of a fuel injection quantity setting routine. This routine is started when the ignition switch is turned on, and thereafter, is repetitively executed at each predetermined time. According to this routine, the fuel injection quantity Qf is set.

In S401, the operating conditions of the engine 1, such as the engine rotating speed Ne and an accelerator opening, or an accelerator operating amount in the present embodiment, APO and the like are read in.

In S402, the abnormality judgment flag Fscr is read in, and it is judged whether or not the read flag Fscr is 0. When the flag Fscr is 0, the routine proceeds to S403, while when the flag Fscr is not 0, it is judged that the abnormality occurs in the urea water injection system and the routine proceeds to S404.

In S403, a map for normal operation is selected, and also the selected map is retrieved based on the read operating conditions Ne and APO, to thereby set the fuel injection quantity Qf.

In S404, the connection between the starter, and a power supply unit for this starter such as an alternator, a battery or the like, is broken, so that the starter is not operated at the next starting time after the operation of the engine 1 stops, to inhibit the restarting of the engine operation.

In S405, a vehicle speed VSP is read in. The vehicle speed VSP may be detected directly by detecting a rotating speed of an output shaft of a transmission. However, the vehicle speed VSP may be detected indirectly by converting the engine rotating speed Ne with a gear ratio of the transmission.

In S406, it is judged whether or not the read vehicle speed VSP is equal to or larger than a predetermined value VSP1. When the vehicle speed VSP is equal to or larger than the value VSP1, the routine proceeds to S407, while when the vehicle speed VSP is smaller than the value VSP1, the routine proceeds to S403.

In S407, a map for output restriction operation is selected, and also the selected map is retrieved based on the read operating conditions Ne and APO, to thereby set the fuel injection quantity Qf. The fuel injection quantity Qf set using this map is smaller than the fuel injection quantity Qf set using the map for normal operation under the same Ne and APO, and therefore, the output (that is, the output torque) of the engine 1 is restricted. In the present embodiment, the torque to be generated at the time of the output restriction operation is made to be the minimum torque necessary for steadily moving on a flat road at a speed of the predetermined value VSP1, so that the moving at a speed exceeding the predetermined value VSP1 is restricted during a period of time until the occurred abnormality is removed. When the abnormality occurs in the urea water injection system, since the injection of the urea water is stopped (S305) as described in the above so that the unstable injection of the urea water is avoided, the $NO_x$ generation itself is suppressed as much as possible by a comprehensive engine control including the setting of the fuel injection quantity Qf.

In S408, a fuel cut flag Fcut is read in, and it is judged whether or not the read flag Fcut is 0. When the flag Fcut is 0, the routine proceeds to S409, while when the flag Fcut is not 0, the routine proceeds to S410. The fuel cut flag Fcut is normally set at 0, and when it is judged that the fuel supply is to be stopped, as described in the following, the flag Fcut is switched to 1.

In S409, the fuel injection quantity Of as set in the above manner is set as an output injection quantity Qfset, and an operation signal according to the output injection quantity Qfset is output to the injector 21.

In S410, the fuel injection quantity Qf is set at 0, to thereby stop the fuel injection.

Figure 8:
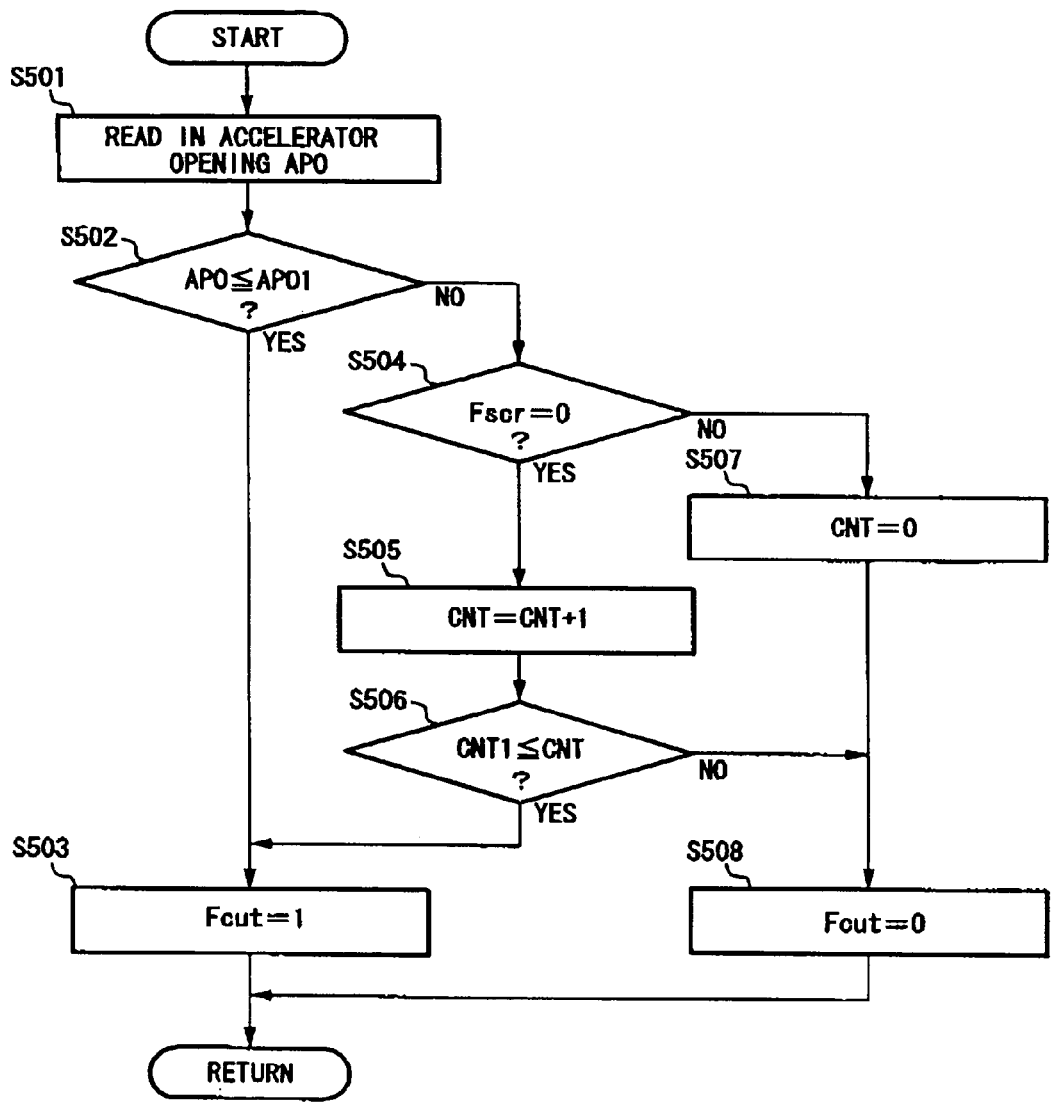
FIG. 8 shows a flowchart of a urea water injection control routine.

FIG. 8 shows a flowchart of a fuel cutting routine. This routine is started when the ignition switch is turned on, and thereafter, is repetitively executed at each predetermined time. According to this routine, the fuel cut flag Fcut is set.

In S501, the accelerator opening APO is read in.

In S502, it is judged whether or not the read accelerator opening APO is equal to or smaller than a predetermined value APO1. When the accelerator opening APO is equal to or smaller than the value APO1, the routine proceeds to S503, while when the accelerator opening APO is larger than the value APO1, the routine proceeds to S504.

In S503, the fuel cut flag Fcut is set at 1 so as to stop the fuel injection.

In S504, the abnormality judgment flag Fscr is read in, and it is judged whether or not the read flag Fscr is 0. When the flag Fscr is 0, the routine proceeds to S505, while when the flag Fscr is not 0, the routine proceeds to S507.

In S505, a counter CNT is counted up by 1 (CNT=CNT+1). This counter CNT corresponds to an elapsed time from the time when the abnormality occurs in the urea water injection system.

In S506, it is judged whether or not the counter CNT counted up reaches a predetermined value CNT1. When the counter CNT reaches the value CNT1, the routine proceeds to S503, while when the counter CNT does not reach the value CNT1, the routine proceeds to S508.

In S507, the counter CNT is set at 0.

In S508, the fuel cut flag Fcut is set at 0, to thereby execute the fuel injection.

In the present embodiment, the tank 41, the urea water supply pipe 42, the injection nozzle 43, the feed pump 44 and the air supply pipe 48 constitute an addition device of the reducing agent. The urea sensor 74 has both of functions as a first sensor for detecting the concentration of urea and a second sensor for judging the residual quantity of urea water. Further, out of functions of the SCR-C/U 61, the function of the entire flowchart shown in FIG. 4 corresponds to an abnormality detecting means in the present embodiment, and the function of the entire flowchart shown in FIG. 7 and of S504 to S507 in the flowchart shown in FIG. 8 corresponds to a control means in the present embodiment.

According to the present embodiment, the following effects can be achieved.

Firstly, when the abnormality occurs in the urea water injection system, the map for setting the fuel injection quantity is switched so that the fuel injection quantity Qf is decreased than that at the normal time under the same accelerator opening APO, and the output of the engine 1 is restricted. Therefore, at the time of the abnormality occurrence, it is possible to restrict the moving of the automobile, and to urge the driver to repair the urea water injection system, so that an appropriate maintenance of the urea water injection system can be achieved.

Secondly, only when the vehicle speed VSP exceeds the predetermined value VSP1, the output of the engine 1 is restricted, so that a minimum function as the automobile can be assured. Therefore, it is possible to effectively urge the repair while avoiding a traffic confusion or the like due to the excessive restriction of the engine output.

Thirdly, when the abnormality occurs in the urea water injection system, the restarting of the engine operation is inhibited, and also, after the predetermined time elapses, the fuel injection and thereby the engine operation is stopped. Therefore, it is possible to urge the driver to promptly go to a service station for performing the repair. In the present embodiment, since the warning light is operated at the time when the abnormality occurrence is detected, the driver can recognize promptly the abnormality occurrence to go to the service station. Incidentally, in the present embodiment, the fuel supply is stopped immediately at the time when the predetermined time elapses after the detection of the abnormality occurrence (S410). However, the configuration may be such that the fuel injection quantity Qf is gradually decreased, so as to make the fuel supply gradually stop.

Fourthly, as the abnormality occurred in the urea water injection system, the lack of the residual quantity of the urea water or the dilution of the urea water is detected, so that the appropriate management of the urea water can be promoted. In particular, the latter dilution is detected, and therefore, it is possible to prevent the improper use or the erroneous use of excessively dilute urea water, different type of aqueous solution other than the urea water or the like.

Other embodiments of the present invention will be described in the following.

Figure 9:
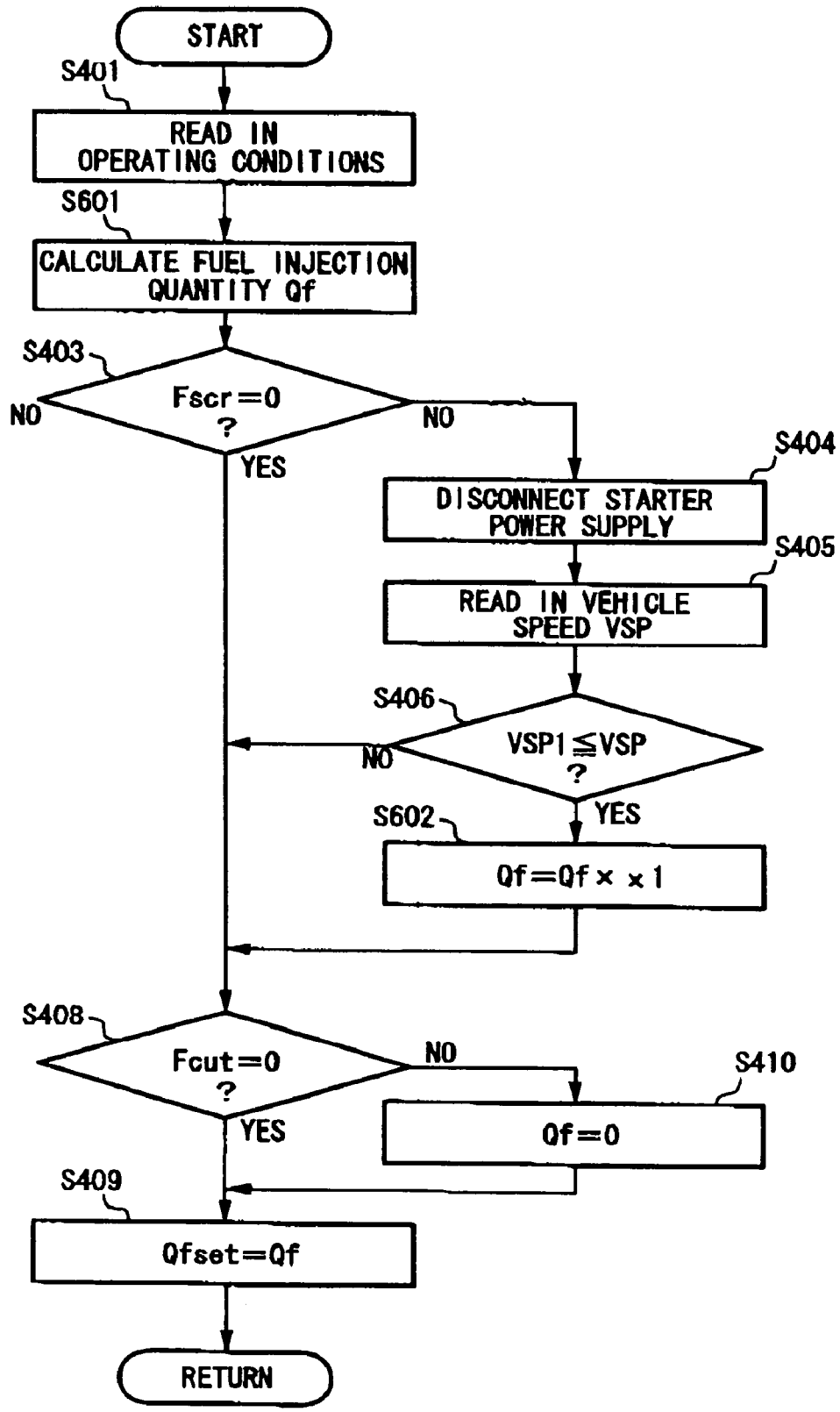
FIG. 9 shows a flowchart of a fuel injection quantity setting routine according to a second embodiment of the present invention.

FIG. 9 shows a flowchart of a fuel injection quantity setting routine according to a second embodiment. This routine is also started when the ignition switch is turned on, and thereafter, is repetitively executed at each predetermined time. Each step in which the processing same as that in the flowchart shown in FIG. 7 is denoted by the same reference numeral.

In this routine, after the various operating conditions, such as the accelerator opening APO and the like, are read in (S401), in S601, the fuel injection quantity Of is set based on the read operating conditions. When it is judged that the abnormality judgment flag Fscr is 1 and accordingly, the abnormality occurs in the urea water injection system (S402), the connection between the starter and the power supply unit is broken (S404). After the vehicle speed VSP is read in (S405), it is judged that the read vehicle speed VSP is equal to or larger than the predetermined value VSP1, the routine proceeds to S602 where the previously set Qf is multiplied by a coefficient x1, and the fuel injection quantity Qf is replaced with the obtained value (=Qf×x1). This coefficient x1 is one for restricting the output of the engine 1 and is set at a value which is larger than 0 and also smaller than 1. When it is judged that the fuel cut flag Fcut is not 0 (S408), the fuel injection quantity Qf is set at 0 (S410), to thereby stop the fuel injection. The fuel injection quantity Qf set as in the above manner is set to the output injection quantity Qfset (S409), to thereby operate the injector 21.

In the present embodiment, the function of the entire flowchart shown in FIG. 9 (and of S504 to S507 in the flowchart shown in FIG. 8) corresponds to a control means.

According to the present embodiment, in addition to the above first to fourth effects, since there is no need to prepare the fuel injection quantity setting map individually for the normal time and the time of the abnormality occurrence, the storage capacity of the engine C/U 51 can be reduced.

Figure 10:
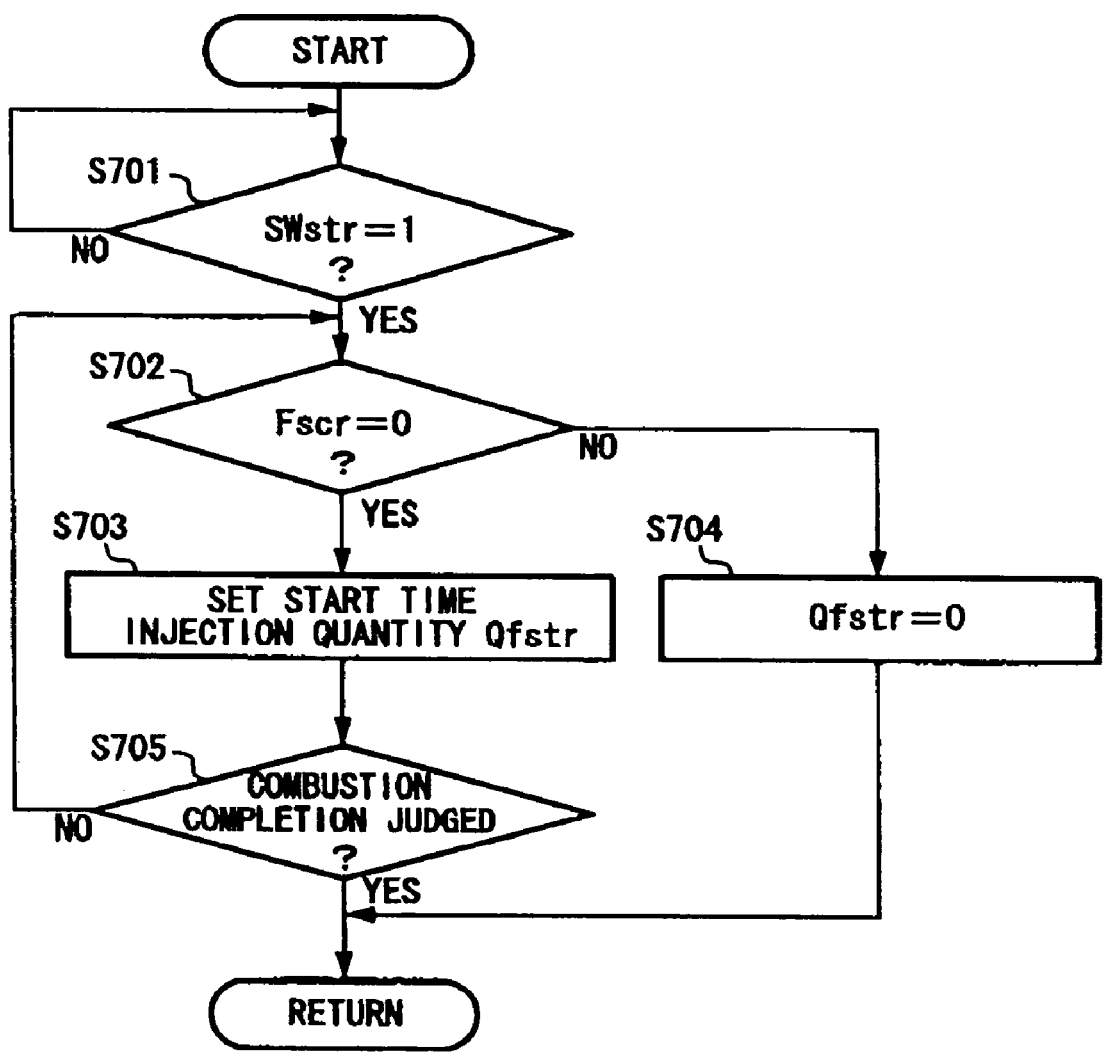
FIG. 10 shows a flowchart of a start control routine according to a third embodiment of the present invention.

FIG. 10 shows a flowchart of a start control routine according to a third embodiment. This routine is started when the start switch is turned on. Relative to the first embodiment, the present embodiment provides a modification of the control for inhibiting the restarting of the engine operation at the time of the abnormality occurrence. The fuel injection quantity setting routine is given as one in which the processing of S404 in the routine of the first embodiment (FIG. 7) is omitted.

In S701, the start switch signal SWstr is read in, and it is judged whether or not the read signal SWstr is 1. When the signal SWstr is 1, the routine proceeds to S702 where a start control as described in the following is performed.

In S702, the abnormality judgment flag Fscr is read in, and it is judged whether or not the read flag Fscr is 0. When the flag Fscr is 0, the routine proceeds to S703, while when the flag Fscr is not 0, it is determined that the abnormality occurs in the urea water injection system and the routine proceeds to S704.

In S703, a normal fuel injection quantity Qfstr for the start control (to be referred to as a start time injection quantity hereunder) is set. The start time injection quantity Qfstr is set according to the cooling water temperature Tw and the like, as a value larger than the fuel injection quantity equivalent to a stoichiometric air-fuel ratio.

In S704, in order to inhibit the starting of the engine operation, the start time injection quantity Qfstr is set at 0.

In S705, it is judged whether or not the combustion completes, and when it is judged that the starting of the engine operation completes, this routine is terminated, to be shifted to the fuel injection quantity setting routine. Here, the combustion completion judgment is performed based on the engine rotating speed Ne, and when a change rare of the engine rotating speed Ne per unit time reaches a predetermined value, it is judged that the engine operation starts.

In the present embodiment, the function of S702 and S704 in the flowchart shown in FIG. 10 (and of the entire flowchart (excluding S404) shown in FIG. 7 and S504 to S507 in the flowchart shown in FIG. 8) corresponds to a control means.

According to the present embodiment, at the time of the abnormality occurrence, the restarting of the engine operation is inhibited by making the fuel supply stop, and a cranking itself by the starter can be performed. Therefore, at an emergency time, such as the time when the engine operation stops on the railroad crossing or the like, it is possible to perform an escape from this place.

Figure 11:
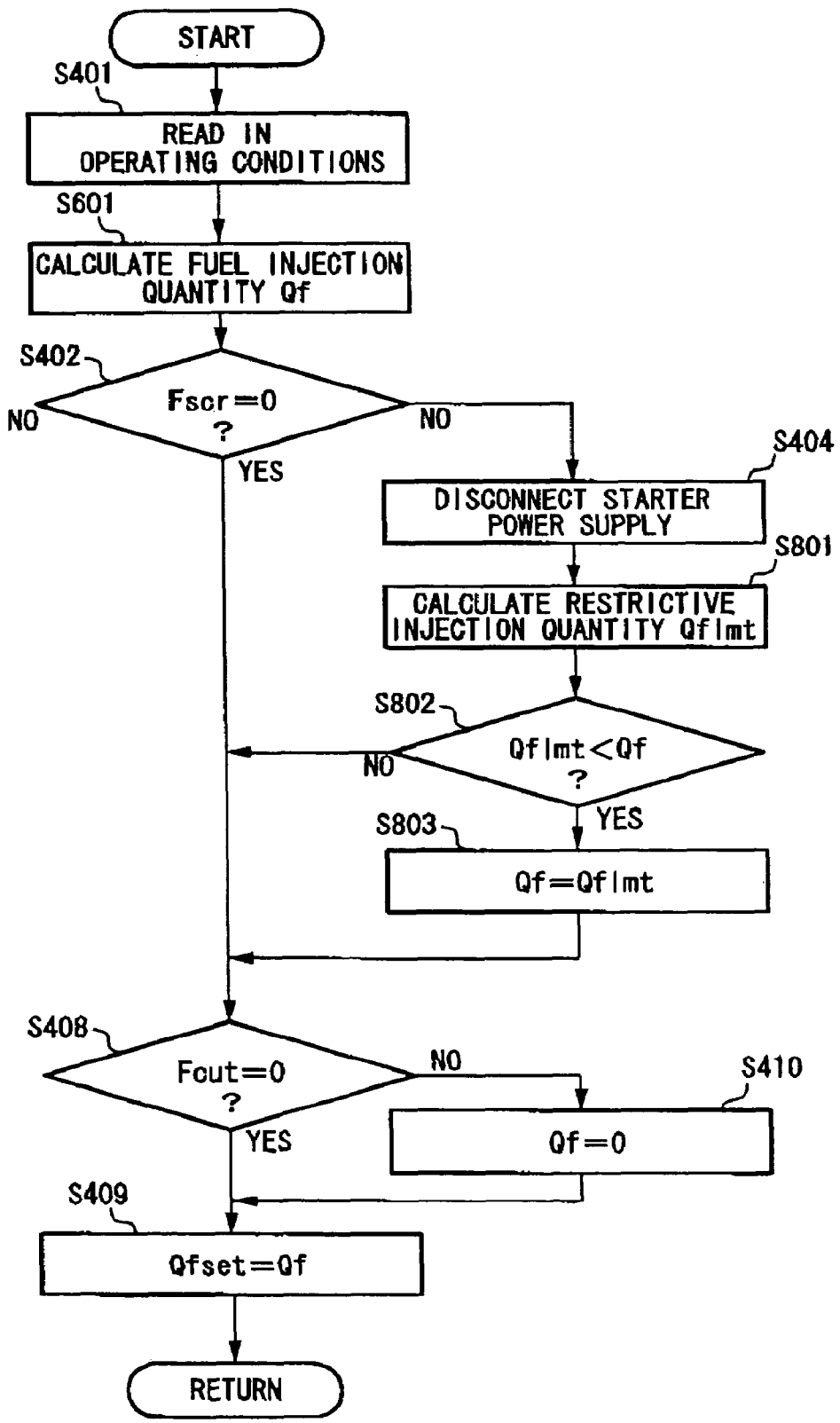
FIG. 11 shows a flowchart of a fuel injection quantity setting routine according to a fourth embodiment of the present invention.

FIG. 11 shows a flowchart of a fuel injection quantity setting routine according to a fourth embodiment. This routine is started when the ignition switch is turned on, and thereafter, is repetitively executed at each predetermined time.

Figure 12:
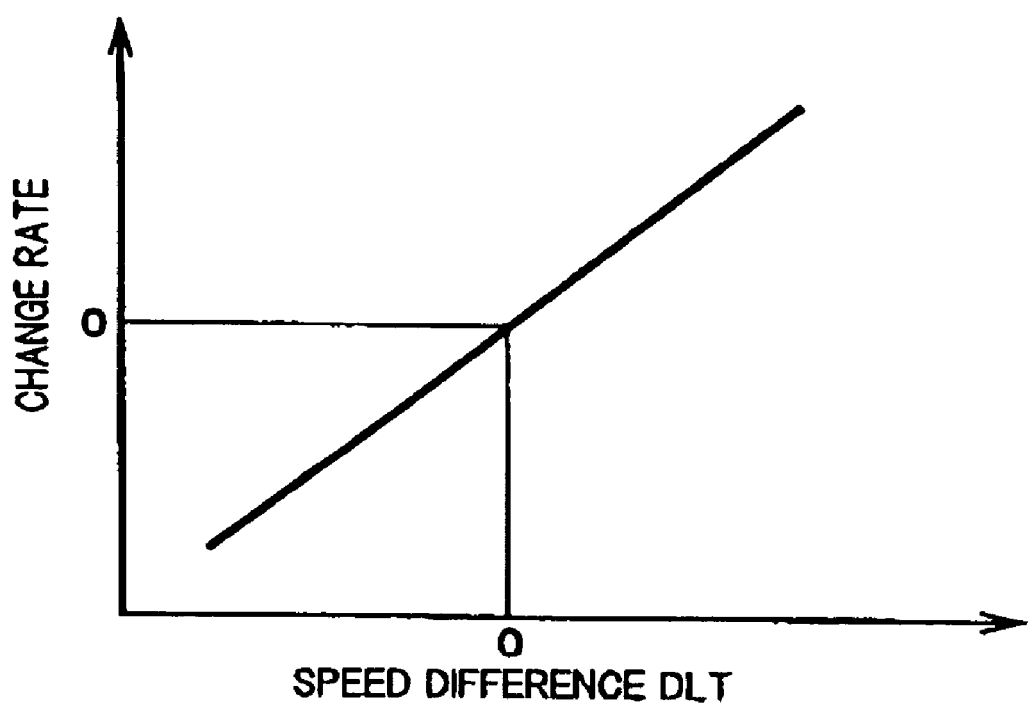
FIG. 12 illustrates a table for setting a change rate according to the fourth embodiment.

In this routine, the various operating conditions, such as the accelerator opening APO, the vehicle speed VSP and the like, are read in (S401), and based on the read operating conditions, the fuel injection quantity (corresponding to a second fuel supply quantity) Qf is set (S601). When it is judged that the abnormality judgment flag Fscr is 1 and accordingly, the abnormality occurs in the urea water injection system (S402), the connection between the starter and the power supply unit is broken (S404), and also, in S801, a restrictive injection quantity (corresponding to a first fuel supply quantity) Qflmt is set. The restrictive injection quantity Qflmt is set as one for restricting the output of the engine I at the time of the abnormality occurrence, and in the present embodiment, is calculated according to the following formula, based on an actual vehicle speed VSP. In the following formula, Qfvsp is set as a fuel injection quantity necessary for steadily moving on the flat road at the vehicle speed VSP at the time when the abnormality occurrence is detected, and is calculated by retrieving a table of each vehicle speed previously stored in the engine C/U 51. Further, Qfdlt is a correction amount according to a difference DLT (=VSP−VSP1) between the vehicle speed VSP and the predetermined value VSP1, and assuming a change rate for each execution cycle of this routine to be DQ, Qfdlt is calculated by integrating the change rate DQ. The change rate DQ is calculated as a larger value as the speed difference DLT is larger (FIG. 12), and is calculated as a negative value when the vehicle speed VSP is smaller than the predetermined value VSP1.

$$Qflmt = Qfvsp - Qfdlt \quad (5a)$$

$$Qfdlt = Qfdlt + DQ \quad (5b)$$

In S802, it is judged whether or not the fuel injection quantity Qf is larger than the restrictive injection quantity Qflm. When the fuel injection quantity Qf is larger, the fuel injection quantity Qf is replaced with the restrictive injection quantity Qflmt so that the fuel injection quantity is restricted, and thereafter, the routine proceeds to S408. At the time other than the above, the routine directly proceeds to S408. The subsequent processing is same as that described above. When it is judged that the fuel cut flag Fcut is not 0 (S408), the fuel injection quantity Qf is set at 0 (S410), to thereby make the fuel injection stop. The fuel injection quantity Qf set as in the above manner is set to the output injection quantity Qfset (S409), to thereby operate the injector 21.

In the present embodiment, the function of the entire flowchart shown in FIG. 11 (and of S504 to S507 in the flowchart shown in FIG. 8) corresponds to a control means.

In the present embodiment, in setting of the restrictive injection quantity Qflmt, the vehicle speed VSP is fed back so that the adjustment of the restrictive injection quantity Qflmt is performed based on the vehicle speed VSP. Therefore, at the time of the abnormality occurrence, it is possible to accurately control the vehicle speed VSP at the predetermined value VSP1 to suppress the $NO_x$ discharge until the urea water injection system is repaired. Further, the change rate DQ of the correction amount Qfdlt (namely, the restrictive injection quantity Qflmt) is calculated as a larger value as the speed difference DLT is larger. Therefore, it is possible to converge promptly and smoothly the vehicle speed VSP into the predetermined value VSP1.

Figure 13:
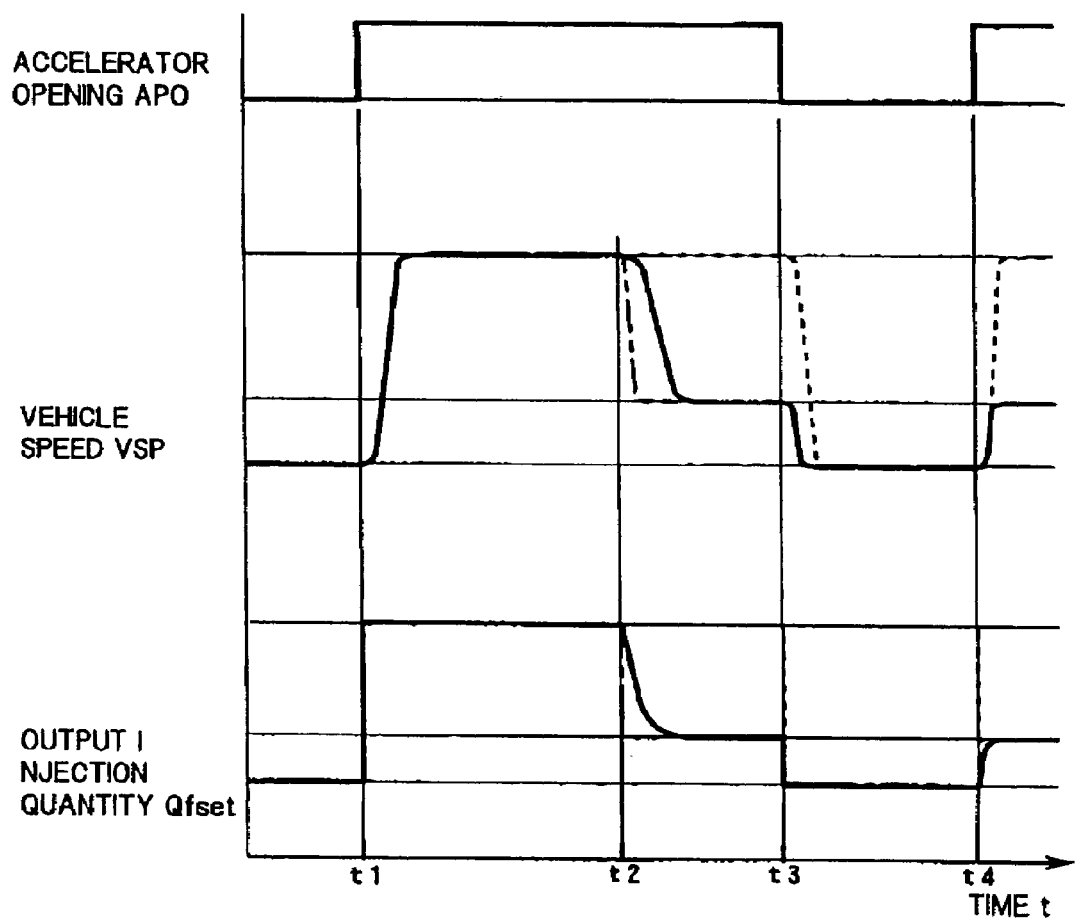
FIG. 13 illustrates a concept of output restriction according to the fourth embodiment.

FIG. 13 shows a time chart of the accelerator opening APO, the vehicle speed VSP and the fuel injection quantity (namely, the output injection quantity Qfset) Qf before and after the abnormality occurrence. At the time t1, on depression of the accelerator pedal, the fuel injection quantity Qf according to the accelerator opening APO and the like is set, and the vehicle speed VSP increases. At the time 2, when the abnormality occurs in the urea water injection system, the output injection quantity Qfset is made to decrease at a speed according to the speed difference DLT (that is, the change rate DQ), and the vehicle speed VSP is restricted to the predetermined value VSP1. At the time 3, when the accelerator pedal is returned, and the fuel injection quantity Qf is lower than the restrictive injection quantity Qflmt, the fuel injection quantity Qf is set at the output injection quantity Qfset, to thereby achieve the deceleration. Thereafter, at the time 4, when the accelerator pedal is again depressed, the restrictive injection quantity Qflmt is set at the output injection quantity Qfset unless the abnormality occurred in the urea water injection system is removed, and the output of the engine 1 is restricted.

In the present embodiment, the vehicle speed VSP is fed back for calculating the restrictive injection quantity Qflmt, so that the vehicle speed VSP is coincident with the predetermined value VSP1. However, it is also possible to inhibit the moving at a speed exceeding the predetermined value VSP1 by setting the restrictive injection quantity Qflmt as follows. Namely, the fuel injection quantity necessary for moving on the flat road at the predetermined value VSP1 is previously stored in the engine C/U 51 as the restrictive injection quantity Oflmt. At the time of the abnormality occurrence, the smaller one of the fuel injection quantity Qf calculated based on the accelerator opening APO and the like, and the stored restrictive injection quantity Qflmt, is set at the output injection quantity Qfset. It is not preferable to abruptly decrease the engine torque during the high speed traveling. Therefore, by unconditionally selecting the fuel injection quantity Qf until the predetermined period of time elapses after the abnormality occurrence, the switching from the fuel injection quantity Qf to the restrictive injection quantity Qflmt may be delayed by the predetermined period of time, or by using the stored restrictive injection quantity as a target value, the restrictive injection quantity Qflmt may be set with a predetermined delay in a change toward the target value.

In the above description, ammonia is generated by the hydrolysis of urea, but a catalyst for this hydrolysis has not been especially specified. In order to enhance the hydrolysis efficiency, a hydrolysis catalyst may be disposed upstream of the NOx purification catalyst 33.

Further, in the above, the example for the case where ammonia is adopted as a NOx reducing agent has been described. However, in place of ammonia, hydrocarbon may be adopted.

As the engine, a diesel engine other than direct injection type or a gasoline engine may be adopted.

While the present invention has been described according to several preferred embodiments, the scope of the present invention is not limited to this description, and is judged based on the disclosure in the scope of claims in accordance with applied articles.

We claim:

1. An engine control apparatus mounted on a vehicle and configured to be in cooperation with an engine, the engine including an addition device for adding a NOx reducing agent to exhaust gas of the engine, the engine control apparatus comprising:
a control unit for controlling the engine, wherein
the control unit is configured to detect an abnormality occurrence in the addition device, and to restrict an output torque of the engine in response to detecting the abnormality occurrence in the addition device so that a vehicle speed is restricted at or smaller than a predetermined value.

2. An engine control apparatus according to claim 1, wherein, at the time of the abnormality occurrence, the control unit varies an output characteristic of the engine relative to an accelerator operation by a driver from that at a normal time other than the time of the abnormality occurrence.

3. An engine control apparatus according to claim 2, wherein the control unit changes a fuel supply quantity to the engine at the time of the abnormality occurrence from that at the normal time, under the same accelerator operating amount, to vary the output characteristic of the engine.

4. An engine control apparatus according to claim 3, wherein, on the basis of the same accelerator operating amount, the control unit decreases the fuel supply quantity at the time of the abnormality occurrence than that at the normal time.

5. An engine control apparatus according to claim 3,
wherein the control unit, at the time of the abnormality occurrence, calculates a first fuel supply quantity for controlling the vehicle speed at the predetermined value, and also calculates a second fuel supply quantity according to an accelerator operating amount, and sets the smaller one of the first and second fuel supply quantities as a final fuel supply quantity.

6. An engine control apparatus according to claim 3, wherein the control unit stores a first fuel supply quantity previously set as one for maintaining the vehicle speed at the predetermined value, and at the time of abnormality occurrence, calculates a second fuel supply quantity according to an accelerator operating amount, and sets the smaller one of the first and second fuel supply quantities as a final fuel supply quantity.

7. An engine control apparatus according to claim 3, wherein the control unit detects the vehicle speed, and varies the fuel supply quantity only when the detected vehicle speed is larger than the predetermined value.

8. An engine control apparatus according to claim 1, wherein the control unit inhibits restarting of the engine operation after the engine operation stops, to restrict the output of the engine.

9. An engine control apparatus according to claim 8, wherein the control unit breaks the connection between a starter for cranking the engine, and a power supply unit for the starter, to thereby inhibit the restarting of the engine operation.

10. An engine control apparatus according to claim 8, wherein the control unit inhibits the fuel supply to the engine, to thereby inhibit the restarting of the engine operation.

11. An engine control apparatus according to claim 1, wherein the control unit stops the engine operation after a predetermined period of time has elapsed from detection of the abnormality occurrence.

12. An engine control apparatus according to claim 1, wherein the engine comprises a tank for storing an aqueous solution of the NOx reducing agent or a precursor thereof, which is added to the exhaust gas by the addition device, and
wherein the control unit comprises a first sensor for detecting a concentration of the NOx reducing agent or the precursor contained in the aqueous solution stored in the tank, and when a value of the concentration detected by the first sensor is out of a predetermined range, detects the abnormality occurred in the addition device.

13. An engine control apparatus according to claim 12, wherein the first sensor comprises a sensor element part disposed in the tank, and a circuit part connected to the sensor element part, and wherein
the sensor element part includes a heater, and a temperature sensing element disposed to be in directly or indirectly contact with the aqueous solution in the tank and to be heated by the heater, the temperature sensing element having a property in which an electrical characteristic value thereof changes according to a temperature thereof, and
the circuit part activates the heater and also detects the electrical characteristic value of the heated temperature sensing element, and detects the concentration of the NOx reducing agent or the precursor based on the detected electrical characteristic value.

14. An engine control apparatus according to claim 1, wherein the engine comprises a tank for storing an aqueous solution of the NOx reducing agent or a precursor thereof, which is added to the exhaust gas by the addition device, and
wherein the control unit comprises a second sensor for detecting a residual quantity of the aqueous solution stored in the tank, and when a value of the residual quantity detected by the second sensor is smaller than a predetermined value, detects the abnormality occurred in the addition device.

15. An engine control apparatus according to claim 1, wherein the NOx reducing agent is ammonia.

16. An engine control apparatus according to claim 15, wherein the addition device adds urea as a precursor of ammonia to the exhaust gas, to thereby add the NOx reducing agent.

17. An engine control apparatus according to claim 1, wherein at the time of the abnormality occurrence, the control unit operates a warning device for notifying a driver of the abnormality occurrence.

18. An engine control apparatus according to claim 1, comprising a first control unit for controlling the engine, and a second control unit for controlling the addition device, wherein
the second control unit controls the addition device at both of the time of the abnormality occurrence, and a normal time other than the time of the abnormality occurrence, and
the second control unit, at the normal time, operates the addition device to add the NOx reducing agent by an amount according to engine operating conditions, while at the time of the abnormality occurrence, stops the adding of the NOx reducing agent by the addition device.

19. An engine control apparatus mounted on a vehicle and configured to be in cooperation with an engine, the engine including an addition device for adding a NOx reducing agent to exhaust gas of the engine, the engine control apparatus comprising:
detection means for detecting an abnormality occurrence in the addition device; and
control means for restricting an output torque of the engine in response to detection of the abnormality occurrence in the addition device by the detection means so that a vehicle speed is restricted at or smaller than a predetermined value.

20. A method for operating an engine mounted on a vehicle at both a time of an abnormality occurrence when an abnormality occurs in an addition device, and a normal time other than the time of the abnormality occurrence, the addition device being disposed in the engine to add a NOx reducing agent to exhaust gas of the engine, the method comprising the steps of:
operating, at the normal time, the engine with a first characteristic in which an output torque of the engine corresponding to an accelerator operating amount by a driver is obtained, wherein an operating condition of the engine is detected, and an amount of the NOx reducing agent corresponding to the detected operating condition is added by the addition device, and
in response to a detection of an abnormality occurrence, operating the engine with a second characteristic in which the output torque of the engine relative to the accelerator operating amount is decreased from that obtained when operating the engine with the first characteristic, so that a vehicle speed is restricted at or smaller than a predetermined value.

* * * * *

UNITED STATES PATENT AND TRADEMARK OFFICE
CERTIFICATE OF CORRECTION

| | |
|---|---|
| PATENT NO. | : 7,685,810 B2 |
| APPLICATION NO. | : 10/576720 |
| DATED | : March 30, 2010 |
| INVENTOR(S) | : Kiminobu Hirata et al. |

It is certified that error appears in the above-identified patent and that said Letters Patent is hereby corrected as shown below:

IN THE SPECIFICATION:

In Column 2, Line 52: Replace "Fig. 8" with --Fig. 6--

Signed and Sealed this
First Day of February, 2011

David J. Kappos
*Director of the United States Patent and Trademark Office*